Aug. 4, 1931. G. SPERTI 1,817,537
ELECTRICAL MEASURING INSTRUMENT
Original Filed Feb. 16, 1922  2 Sheets-Sheet 1

WITNESSES:
INVENTOR
George Sperti
BY
ATTORNEY

Aug. 4, 1931.  G. SPERTI  1,817,537
ELECTRICAL MEASURING INSTRUMENT
Original Filed Feb. 16, 1922  2 Sheets-Sheet 2

INVENTOR
George Sperti
ATTORNEY

Patented Aug. 4, 1931

1,817,537

UNITED STATES PATENT OFFICE

GEORGE SPERTI, OF COVINGTON, KENTUCKY, ASSIGNOR, BY DIRECT AND MESNE ASSIGNMENTS, TO WESTINGHOUSE ELECTRIC & MANUFACTURING COMPANY, A CORPORATION OF PENNSYLVANIA

ELECTRICAL MEASURING INSTRUMENT

Original application filed February 16, 1922, Serial No. 536,956. Divided and this application filed May 7, 1924. Serial No. 711,633.

My invention relates to electric meters and particularly to graphic demand meters.

The present application is a division of my application, Serial No. 536,956, filed February 16, 1922.

One object of my invention is to provide a meter that shall have means for measuring reactive volt-ampere demand, watt demand and the total or volt-ampere demand.

Another object of my invention is to provide a meter that shall have means, including a chart, for recording the average power factor of a load over a predetermined demand interval.

Figure 1:
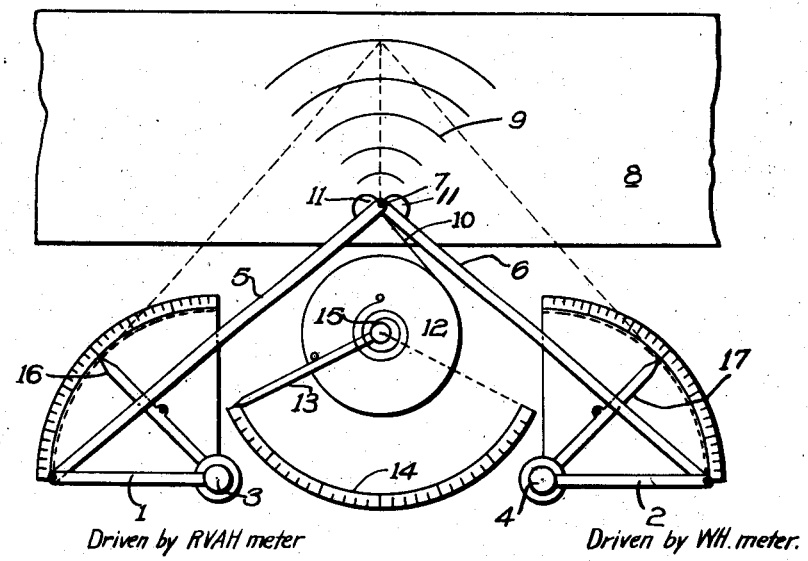
Figure 2:
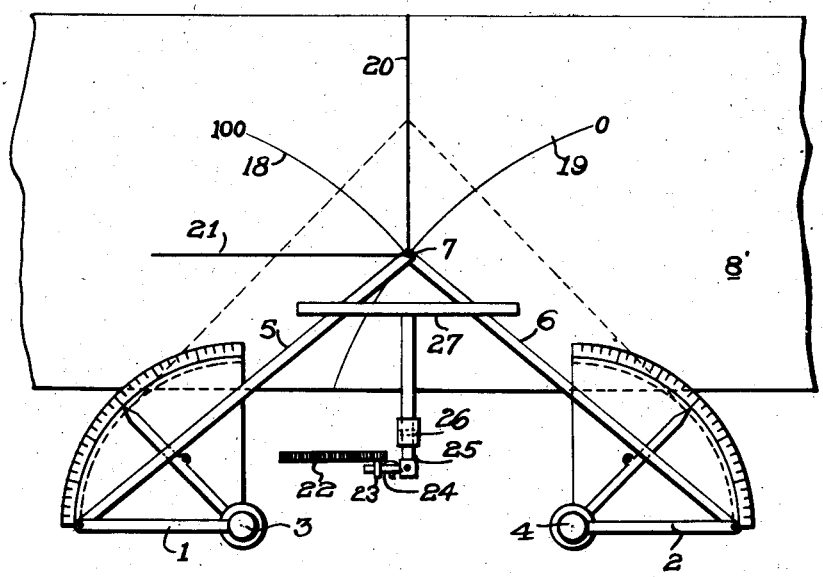

Referring to the accompanying drawings wherein I have illustrated concrete embodiments of my invention, Figure 1 is a plan view of a meter which embodies certain features of the invention; and Fig. 2 is a similar view of a modification thereof.

Figure 3:
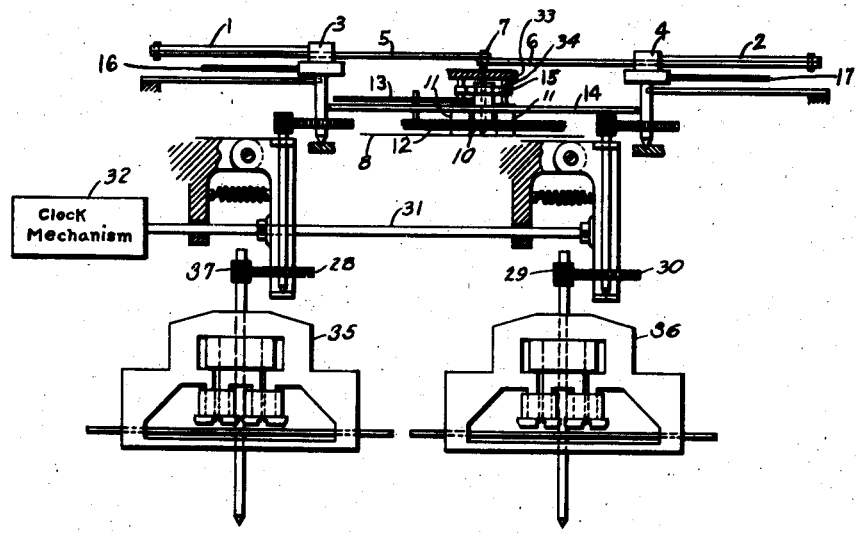

Fig. 3 is an elevational view of the meter shown in Fig. 1.

Referring to Figures 1 and 3, the meter comprises two arms 1 and 2, pivotally mounted at 3 and 4, respectively. The arm 1 is driven in any suitable manner by a reactive volt-ampere-hours meter 35 as shown in Fig. 3. The arm 2 is similarly driven by a watt-hour meter 36. These meters are of the usual integrating demand type, such as that disclosed in Patent No. 1,336,611, issued April 13, 1920, to Bradshaw et al.

The detailed construction of such meters is disclosed in my prior application above referred to. The motor elements of the meters 35 and 36 are geared to arms 1 and 2 to drive them at a rate proportional to the power and reactive components of the load, respectively, for a certain period of time. This period, which is termed the demand interval, may be 15 minutes. At the end of this demand interval, the driving connection between gears 37 and 28 and 29 and 30, respectively, is broken by the movement of the member 31 of the clock mechanism 32 and the recording elements including the arms 1 and 2 are permitted to restore to normal by the spring 15 which is connected at one end to the bracket 33 by the pin 34. The specific construction of these elements may be similar to that shown in my prior application or in the Bradshaw et al. Patent No. 1,336,611, mentioned above.

The arms 1 and 2 are connected by two links 5 and 6 to a pointer or stylus 7, that is adapted to cooperate with a chart 8. The position of the stylus 7 depends upon the relative movement of the arms 1 and 2, and, therefore, inscribes a line upon the chart in accordance with the magnitude and power factor of the load during each demand interval. The chart 8 is provided with semi-circular reference lines 9 drawn about the initial position of the stylus 7 as a center. These lines may be marked in accordance with the calibration of the meter to facilitate reading the volt-ampere-hour demand of any time interval as represented by the length of the line inscribed by the stylus 7.

A cord 10 is attached to the stylus 7 and passes between two rollers 11 and thence around a drum 12 to which it is secured. The drum 12 is provided with a maximum demand pointer 13 that cooperates with a suitable scale 14 to provide a temporary indication of the maximum volt-ampere demand of which a permanent record is obtained upon the chart. At the end of each demand interval, a spring 15 restores the drum 12, the links 5 and 6, and the arms 1 and 2 to normal. The arms 1 and 2 are also provided with maximum demand pointers 16 and 17 to provide an indication of the maximum reactive and power component demands.

In Fig. 2 is shown a modification of the chart and recording mechanism. The arms 1 and 2 correspond to the same elements in Fig. 1 and cooperate in the same way to actuate a stylus 7 upon a chart 8'. The chart 8' is provided with power-factor lines 18, 19, 20 and 21.

It will be obvious that, when the load is a unity power-factor load, the arm 1 remains stationary, and, therefore, the path of the stylus 7 coincides with the line 18. The position of the stylus 7 at the end of the demand period upon this line indicates an average power factor of 100% during the demand interval. From similar considerations, it will be apparent that the line 19 represents a load the average power factor of which is zero. In the event that the average power factor of the load is between these two values, the stylus 7 will reach a position intermediate the two lines 18 and 19. Thus, if the power factor is 70.7% lagging, the reactive component and power component elements 1 and 2 will be driven at the same rate of speed and the stylus 7 will move along the line 20. The location of the stylus 7 upon the line 20 at the end of the demand interval will indicate, therefore, that the average power factor of the load for the interval was 70.7%. In the same way, for 70.7% power factor leading, the reactive component element 1 will be driven in the reverse direction and the stylus 7 will travel along the line 21.

A pinion 22 of the clock mechanism for timing the demand period carries a pin 23 that is periodically actuated just before the stylus 7 is returned to normal. The pin 23 rocks the bell-crank 24 to turn the arm 25 about its pivot 26. The arm 25 carries a cross piece 27 which bears upon the arms 5 and 6 and actuates the stylus 7, which, in this case, is normally out of contact with the chart. The stylus 7 marks a dot upon the chart, thereby recording its position at the end of the demand interval.

It is apparent that, from the chart, the average power factor for any demand period, and particularly for the period of maximum volt-ampere demand, may be obtained. The maximum volt-ampere demand indication will, of course, be the one which is furthest from the initial position of the stylus 7.

It is also apparent that, from a number of installations such as that described, the comparative maximum demands or average power factor for the maximum-demand periods may be obtained and, from these quantities, the tariff per kilowatt-hour charged each consumer may be calculated upon a graduated scale which takes into account the maximum demand or the average power factor of the load or both.

By the use of demand meters 35 and 36, of the integrating type, I ensure that the maximum demand will be within the range of the instrument and will not be affected by sudden fluctuations of energy due to short-circuits or the like. In accordance with my invention all of the foregoing results are accomplished with relatively simple modifications of standard watthour meters.

I prefer to employ fixed charts that are replaced from time to time but, if desired, they may be movable, as in case of some recording meters.

In the appended claims the term "average power factor" is to be taken to mean the cosine of the angle whose tangent is the average reactive-volt-amperes for a given interval of time divided by the average active-volt-amperes (watts) for that same interval.

I have not attempted to set forth every use to which my invention may be applied and I do not wish to limit the appended claims because of the mention or the omission of certain uses or of mechanical equivalents.

As in my former application for patent, it will be evident that by integrating the power and the reactive components according to time, in the mechanism illustrated, and then vectorially combining the movements, I am enabled to obtain the results shown, which cannot be accomplished in any other way with economy and assured results.

In an installation which operates for a considerable period, such as one hour, without resetting, the power factor may shift around considerably, and the pointer come over various ones of the lines 18, 19, 20 and 21 on the chart. The line over which the pointer lies at the end of the interval of time will give the average power factor, however.

A meter which gives an oscillating indication of a variable power factor, on a chart or scale, is of little assistance in giving average power factor, since the calculation of average power factor from such an indication is extremely difficult. In my device, however, the position of the pointer at any given interval of time with relation to the lines 18 to 21 on the chart, gives the cosine of the angle between the total time-integrated movements resulting from the power and from the reactive components of the volt-amperes, which is the average power factor for that period of time.

I claim as my invention:

1. In combination, a chart, a stylus having a definite initial position and normally out of contact with the chart, means for periodically depressing the stylus into contact therewith and then restoring the same to its initial position, and means for actuating the stylus with respect to the chart in accordance with average power factor demand of an electrical circuit during the intervals between such depressions.

2. In a metering device, an element moving as the time-integrated power component of volt-amperes, an element moving as the time-integrated reactive component of volt-amperes and means controlled by said two elements moving over a chart from an initial position and adapted to mark said chart, said chart being calibrated in power factor lines emanating from the initial position of said marking means to provide an indication of average power factor demand for selected intervals of time.

3. In a metering device having a chart inscribed with lines of average power factor, a marker for said chart and means for actuating one of said mentioned elements in accordance with the vectorially added time-integrated power and reactive components of volt-amperes in such manner that the position of the marker at the end of any given interval of time will indicate the average power factor demand for that period of time.

4. An electrical meter comprising a recording chart, a pointer cooperating therewith, links connected to said pointer, and means for simultaneously driving said links respectively in accordance with the integrated watts and the reactive volt-amperes of an electrical circuit for predetermined equal time intervals, whereby said pointer marks said recording chart in accordance with the average power factor for each time interval.

5. A recording power-factor meter comprising a recording chart, a marking stylus cooperating therewith, means for periodically restoring the marking stylus to normal, and means, including said marking stylus, for inscribing upon said chart the values of average power factor of an electrical circuit over a plurality of equal periods of time.

6. A recording power-factor meter comprising a recording chart and means, including link elements driven in accordance with the active and reactive components of apparent power of an electrical circuit, for inscribing average-power-factor demand values for predetermined equal periods of time upon said chart.

7. In combination, a chart-marking stylus, integrating means responsive to the power and reactive-power components, respectively, of an electrical circuit and connected to said stylus for driving it in accordance with average-power-factor demand, and a chart coacting with said chart-marking stylus for recording said average-power-factor demand.

In testimony whereof, I have hereunto subscribed my name this 29th day of April, 1924.

GEORGE SPERTI.